United States Patent
Walker et al.

(10) Patent No.: US 7,594,189 B1
(45) Date of Patent: Sep. 22, 2009

(54) SYSTEMS AND METHODS FOR STATISTICALLY SELECTING CONTENT ITEMS TO BE USED IN A DYNAMICALLY-GENERATED DISPLAY

(75) Inventors: Toby H. Walker, Seattle, WA (US); David L. Selinger, Seattle, WA (US); John M. Rauser, Seattle, WA (US); Patrik P. Sundberg, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 323 days.

(21) Appl. No.: 11/392,158

(22) Filed: Mar. 29, 2006

Related U.S. Application Data

(60) Provisional application No. 60/673,407, filed on Apr. 21, 2005.

(51) Int. Cl.
*G06F 3/048* (2006.01)
*G06F 17/30* (2006.01)
*G06Q 30/00* (2006.01)

(52) U.S. Cl. .................. 715/811; 705/26; 705/27

(58) Field of Classification Search .......... 705/26–27; 715/811
See application file for complete search history.

(56) References Cited

U.S. PATENT DOCUMENTS

| | | | |
|---|---|---|---|
| 5,446,891 A | 8/1995 | Kaplan et al. | |
| 6,092,049 A * | 7/2000 | Chislenko et al. | 705/10 |
| 6,185,558 B1 | 2/2001 | Bowman et al. | |
| 6,321,221 B1 | 11/2001 | Bieganski | |
| 6,466,970 B1 | 10/2002 | Lee et al. | |
| 6,782,370 B1 * | 8/2004 | Stack | 705/10 |
| 7,295,995 B1 | 11/2007 | York et al. | |
| 2001/0011235 A1 | 8/2001 | Kim et al. | |
| 2001/0014868 A1 * | 8/2001 | Herz et al. | 705/14 |
| 2002/0046099 A1 | 4/2002 | Frengut et al. | |
| 2002/0082923 A1 | 6/2002 | Merriman et al. | |
| 2002/0198882 A1 | 12/2002 | Linden et al. | |
| 2004/0267806 A1 | 12/2004 | Lester | |
| 2005/0038717 A1 | 2/2005 | McQueen, III et al. | |
| 2005/0131762 A1 | 6/2005 | Bharat et al. | |

OTHER PUBLICATIONS

U.S. Appl. No. 10/286,430, filed Oct. 30, 2002.

(Continued)

*Primary Examiner*—Ting Zhou
*Assistant Examiner*—Ashraf Zahr
(74) *Attorney, Agent, or Firm*—Knobbe Martens Olson & Bear LLP

(57) ABSTRACT

An apparatus and methods advantageously select content items for dynamically-generated web pages in an intelligent and virtually autonomous manner. This permits the operator of the web site to rapidly identify and respond to trends, thereby advantageously updating the web site relatively quickly and efficiently without or with less time consuming and expensive manual labor. User interaction for a plurality of users with the web site is collected in a database. For various content items, the database is mined to extract relationships between probability and references of select attributes in probability models. When a new web page is requested, attributes, which can include attributes associated with a user, are used as references to the applicable probability models of selected content items, combined with value weighting to generate expected values, and selected for use in the web page at least partially based on the expected values.

24 Claims, 6 Drawing Sheets

OTHER PUBLICATIONS

U.S. Appl. No. 10/393,505, filed Mar. 19, 2003.

Eirinaki, M. et al., "SEWeP: Using Site Semantics and a Taxonomy to Enhance the Web Personalization Process," Proceedings of the Ninth ACM SIGKDD International Conference on Knowledge Discovery and Data Mining, pp. 99-108, ACM Press, Aug. 2003.

* cited by examiner

SYSTEMS AND METHODS FOR STATISTICALLY SELECTING CONTENT ITEMS TO BE USED IN A DYNAMICALLY-GENERATED DISPLAY

CROSS-REFERENCE TO RELATED APPLICATION

This application claims the benefit under 35 U.S.C. § 119(e) of U.S. Provisional Application No. 60/673,407, filed Apr. 21, 2005, the entirety of which is hereby incorporated by reference.

BACKGROUND

1. Field of the Invention

The invention relates to machine learning methods for identifying content items that are likely to produce a desired user action when incorporated into a dynamically-generated unit of display, such as a web page.

2. Description of the Related Art

Solutions to the selection of what to display in an electronic medium, such as a web page, has been a problem. For example, an organization that provides news articles may find that the content items to include for display change relatively frequently. In addition, appropriate or desirable content to be displayed for one user may not necessarily be of interest to another user.

In one prior technique, a web page is dynamically generated in response to a page request from a user by associating the user to one of a plurality of contexts and by dynamically generating the web page based on the monitored activity of the users in the associated context. For example, 20 contexts can be used. Each of these contexts vary in selected attributes. The attributes associated with the user are identified and compared to the attributes of the plurality of contexts to find the context to which the user most closely corresponds. The activity of users or a subset of users in a particular context is monitored to determine which content items would likely be of value for presenting to other users of the context.

Disadvantageously, such prior techniques do not provide relatively accurate results in real life because individual users within each context can vary considerably from one another. However, arbitrarily increasing the number of contexts is relatively difficult to implement in practice because the number of users in a context can shrink to a relatively small number with a correspondingly small data population from which to estimate behavior. Such problems have limited the number of contexts for practical use and yet still require relatively large amounts of time-consuming manual intervention to associate the user to the correct context. What is needed is a technique to provide more customizable content without a large amount of human intervention.

SUMMARY

Embodiments of the invention advantageously select content items for dynamically-generated displays, such as web pages, using statistical decision techniques. This permits the operator of the web site or other source for the displays to rapidly identify and respond to trends, thereby advantageously updating the web site relatively quickly and efficiently without using or with using less time consuming and expensive manual labor. User interaction for a plurality of users with the web site is collected in an event database. For various content items, the event database is mined to generate a probability model. When a new web page is requested, attributes, which can include attributes associated with the user, are used as references to the applicable models of a selected content item, combined with payoff weighting to generate expected values, and selected for use in the web page at least partially based on the expected values. One embodiment further computes a confidence interval to select content items.

In one example, a user requests a web page, such as a home page of an online retailer. The home web page for that online retailer is dynamically generated together with other content items, such as information for other products that the user may be likely to purchase. In another example, the disclosed techniques are used to select items used to populate another web page, such as web page generated after selection of an item for purchase and prior to checkout, such as a web page of other items that may be of interest to the user.

One embodiment is a system for selecting one or more content items in a dynamically-generated display, where the system includes: a web server system configured to receive a request for a display from a client computer, and to relate the client computer to a particular user; a content selection system in communication with the web server system, where the content selection system is configured to retrieve values for a plurality of attributes of the particular user, and to perform, for a plurality of content items, for each content item in the plurality: retrieve a probability model associated with the content item; compute probabilities with the retrieved attribute values for the particular user as inputs for the probability model; and retrieve payoff values associated with the one or more user responses to the content item; wherein the content selection system is configured to select a content item from the plurality of content items for the dynamically-generated display at least partially based on the probabilities and payoff values.

One embodiment is a method of statistically selecting one or more content items for a dynamically-generated display, where the method includes: retrieving a plurality of probability models associated with candidate content items; using the probability models to compute probabilities of an occurrence of one or more interactive user responses to exposure to the candidate content items; retrieving one or more payoffs associated with the one or more interactive user responses to the candidate content items; and selecting one or more content items from the candidate content items for the dynamically-generated display, wherein the selection is based at least partially on the computed probabilities and the retrieved payoffs.

One embodiment is a method for generating a plurality of probability models for a content item that can be displayed in an interactive display, where the method includes: (a) selecting the content item for which the plurality of probability models are to be generated; (b) collecting records of impressions relevant to the content item; (c) for each relevant impression, performing (d), (e), and (f) to collect information: (d) determining zero or more actual user responses for the impression; (e) retrieving attribute values corresponding to the impression; (f) associating the retrieved attribute values with the zero or more user responses to the impression; (g) retrieving collections of ranges for a plurality of attributes; and (h) determining individual segmented probability sub-models for each type of applicable user response and applicable collection of ranges for the plurality of attributes based on the associated retrieved attribute values and user responses.

BRIEF DESCRIPTION OF THE DRAWINGS

These drawings and the associated description herein are provided to illustrate embodiments and are not intended to be limiting.

DETAILED DESCRIPTION OF PREFERRED EMBODIMENTS

Although particular embodiments are described herein, other embodiments, including embodiments that do not provide all of the benefits and features set forth herein, will also be apparent to those of ordinary skill in the art.

While illustrated in the context of dynamically-generating web pages for a web server and providing those web pages over the Internet, one of ordinary skill in the art will appreciate that the principles and advantages described herein are applicable to other types of file servers that also dynamically generate data on demand and to other types of networks. For example, embodiments of the invention can be used to select content items for other forms of dynamically-generated documents, such as customized displays in a non-standard format, email campaigns, and the like. For example, the content items selected for the dynamically-generated documents can be selected from a variety of sources for a variety of purposes, such as content items for news sources, educational materials, such as computer help knowledge bases, company policy procedure documents for employee training, web portals, commerce web sites, and the like.

Embodiments of the invention select content items for dynamically-generated units of display, such as web pages, in an intelligent and virtually autonomous manner. This permits the operator of the web site to rapidly identify and respond to trends, thereby advantageously updating the web site relatively quickly and efficiently without or at least with less time-consuming and expensive manual intervention.

Web pages can be static or can be dynamically generated. Static web pages are authored, created, or generated off-line and stored in a file system in advance of a web page request. Upon receipt of a web page request for a static web page, the static web page is read from the file system and served. Dynamically-generated web pages are generated on-the-fly by a program, script, or module in response to a web page request.

A dynamically-generated web page is typically based upon a web page template or script, which is interpreted to generate the web page. The template includes code that specifies the structure of the web page and other aspects of the web page that do not change between requested instances of the dynamically-generated page. The interpretation of the web page template, however, can produce a web page with different content items or data, depending upon user or system variables at the time the page is generated. Accordingly, dynamically-generated web pages facilitate web page personalization, web page customization, and/or user interactivity through web pages.

Networked System

Figure 1:
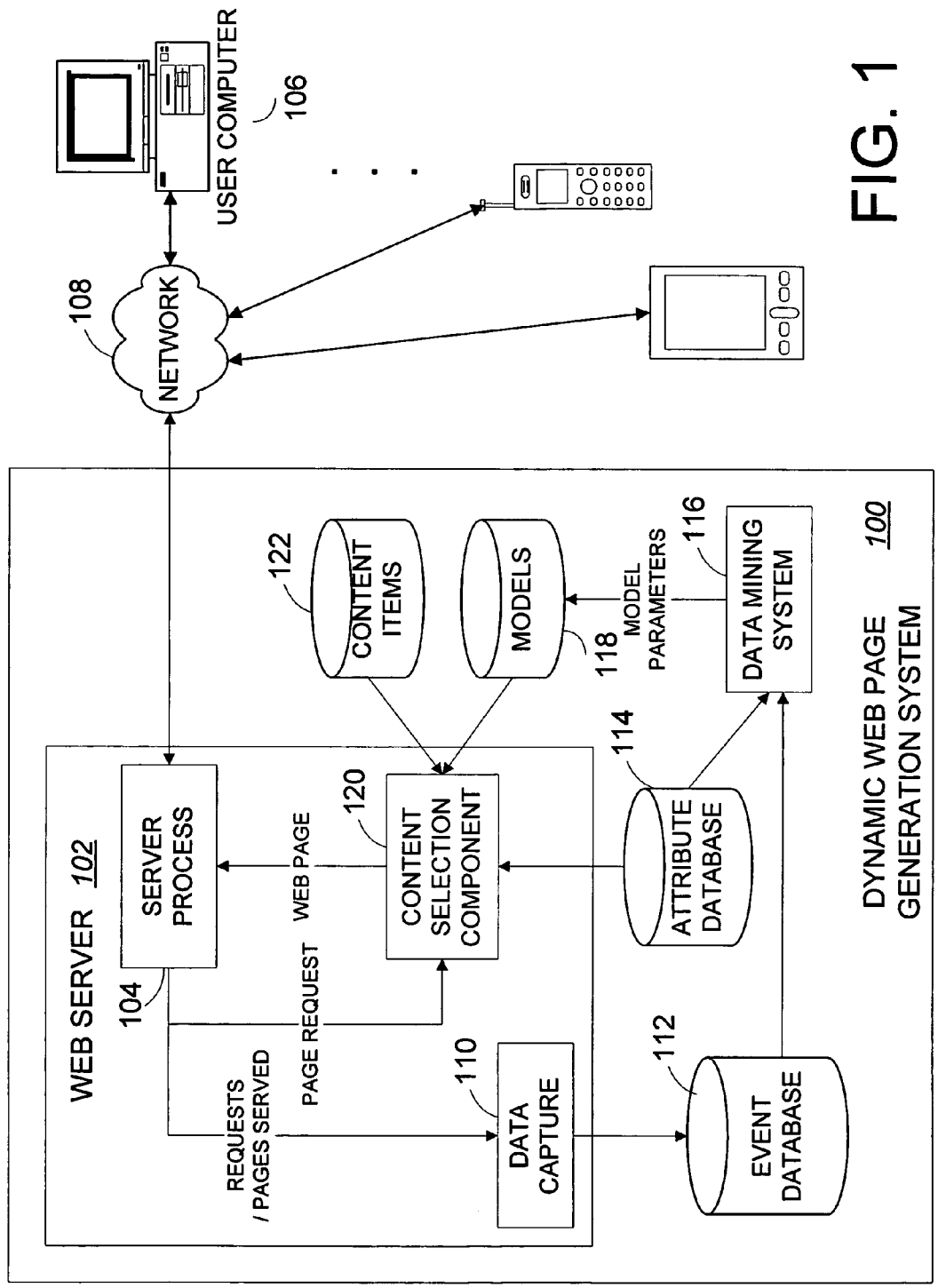
FIG. 1 illustrates a networked system, including web components, for implementing a dynamic web page generation system in accordance with one embodiment of the invention.

FIG. 1 illustrates a networked system, including web components, for implementing a dynamic web page generation system 100 in accordance with one embodiment of the invention. The dynamic web page generation system 100 includes a web server 102, which includes a server process 104 to receive requests for web pages and to serve dynamically-generated web pages. In one embodiment, the server process 104 also serves static web pages.

User Computer

A user computer 106 under the control of a user communicates with the server process 104 of the web server 102 via a network 108 to request web pages and to receive the corresponding web pages. The network 108 can include the Internet, and it will be understood that the network can further include intranets, wired networks, wireless networks, cellphone networks, satellite networks, and the like.

The user computer 106 can use a web browser that executes on a computer to access the web pages. Examples of web browsers include Microsoft® Internet Explorer from Microsoft Corporation, Netscape® Navigator from Netscape, Inc., Mozilla, Mozilla Firefox, Mosaic, and the like. The user can use any one of a variety of different types of computers that can support interactive browsing, such as a personal computer, a laptop, a personal digital assistant (PDA), a Pocket PC, a wireless handheld device, a handheld computer, a mobile browser, a web-enabled cellular telephone, a set top box for a TV, an interactive television, a video gaming console, an interactive kiosk, and the like.

Historical Data

A data capture component 110 maintains an event database 112, which can correspond to, for example, a web server log, a relational database, or virtually any searchable repository of impressions and user activity. An impression can include, for example, indications of the content items provided by the web server 102 to the user computer 106. A particular user can be identified by a login process and/or by a cookie so that multiple browsing sessions across disparate client computers can be tracked. In another example, an Internet Protocol (IP) address of the user computer 106 can be used to track the user's interaction, which can include a user's response action, for a particular browsing session.

Data regarding the browsing activities of each user of the system is collected over a period of time in the event database 112. The user activity data and the impression data may be stored in any of a variety of repository types, such as a server log file or "web log," a database of event data mined from a web log, or a history server that stores event data in real time in association with corresponding users. One example of a history server architecture that may be used to store user activity data and impression data is disclosed in U.S. patent application Ser. No. 10/612,395, filed Jul. 2, 2003, the disclosure of which is hereby incorporated by reference in its entirety. Another possible approach is to collect the event data on a user computers using a special client-side software component, such as a browser plug-in.

The user activity data and the impression data may, for example, include information about every selection event or "click" performed by each user, "mouse over" events detected by an applet, and can include information about dynamic page content (impressions) served to the user. The user activity data can also include user interactivity with a game and user interactivity associated with the viewing of a video clip. In some embodiments, the impression data may also include the HTML or other coding of some or all of the pages served to the user, such that an operator may view the actual sequence of web pages displayed to the user during the course of the failure event. A user's activity data may, in some embodiments, also reflect actions performed by the user on other web sites. For example, activity data may be collected from partner web sites, or may be obtained by having users install a browser "toolbar" plug-in that reports accesses to other web sites.

For example, one conventional event database maintaining impression data includes records for each served web page storing one or more of the following: a Universal Resource Locator (URL) of the web page requested; a referring URL; an IP address for a client computer; an identifier (cookie); a timestamp indicating when the visit occurred; the web browser type, and the number of bytes transferred. In addition, it should be noted that where cookies are not used or are disabled by the user, the URL for the web page can be rewritten to insert a session identifier for the requested web page. It should also be noted that a web page can correspond to a dynamically-generated web page. Accordingly, the event database can further store indications of impressions of the content items of dynamically-generated web pages, and can also include where the content was positioned on a dynamically-generated web page when displayed.

The cookies, IP addresses, and/or rewritten URLs can be used to initially identify the records of the event database 112 that correspond to a particular user. It will be understood that a user number, an account number, a username, an email address, and the like can also be used to identify the records of a particular user. The URLs corresponding to these records can then be retrieved and arranged to reconstruct the URL paths traversed by and the impressions sent to the user computer 106. In one embodiment, the data capture component 110 is implemented with software executed by the web server 102 and can correspond to off-the-shelf software, such as Accrue Insight from Accrue Software, Aria from Andromedia Corp., Bazaar Analyzer Pro from Aquas, WebTrends from Software Inc., Net Analysis Pro from Net Genesis, among others.

An attribute database 114 maintains attributes that will be correlated with user events. For example, the attribute database 114 can include user-specific information such as contact information, shipping addresses, account information, and the like. Other attributes that can be collected will be described in further detail later in connection with FIG. 2. Of course, the database that stores the attribute database 114 can be separate from or combined with other databases, such as the event database 112. It should also be noted that the attribute database 114 can also be spread across multiple databases where the data is voluminous or where selected data, such as credit card numbers, is more securely maintained.

A data mining system 116 scans at least a portion of the event database 112 and correlates events with attributes from the attribute database 114. It should be noted that while the entire event database 112 can be searched and scanned, for the purposes of analysis of trends, less than all of the entire event database 112 can be scanned, which often provides more trustworthy trend analysis as newer data is often more relevant than older data. For example, for seasonal goods, the portion of the event database 112 scanned can correspond to hours or days of data. Scanning less than all the data also enhances the performance of the data mining system 116. In one embodiment, the data mining system 116 scans the event database 112 on an item-by-item basis and produces model parameters for a model of a content item for a particular set of attributes. The characteristics of the attributes, such as a value for browser session time, is used as a reference for the model. Examples of these attributes will be described in greater detail later in connection with FIG. 2. One embodiment of a process to extract model parameters for the model will be described in greater detail later in connection with FIG. 4. In the illustrated embodiment, weights, values, or payoffs for possible outcomes of a user selection of a content item are also used as model parameters in a model. It will be understood that while some model parameters are extracted by correlating user activity with attributes, other model parameters, such as a profit margin, can be retrieved from a database. The models can be stored in a models database 118.

A content selection component 120 is at least partially responsive to a page request from the user computer 106. The content selection component 120 selects one or more content items from a content items database 122 in an intelligent manner. The content selection component 120 uses one or more of the attributes, such as a referring web page, a browser session, a user attribute, a content item attribute, and the like, and computes a probability for one or more user selections from the models for the content item. The content selection component 120 can further weight the probability with predicted values or payoffs (and also costs) to generate an expected value. In response to the computed probability and/or the expected value, the content selection component 120 selects a content item in a manner calculated to be beneficial to the operator of the web server 102.

It should be noted that while some of the systems described in FIG. 1 should be operated in real time, some of the systems can be operated offline, such as in a batch process. In one embodiment, the server process 104, the data capture component 110, and the content selection component 120 are operated in real time, and the data mining system 116 is operated offline. For example, the data mining system 116 can be operated sporadically, such as once an hour, once a day, and the like, as appropriate for the demands of the web site operator and/or the processing capabilities of the applicable dynamic web page generation system 100.

Example of Data Flow

Figure 2:
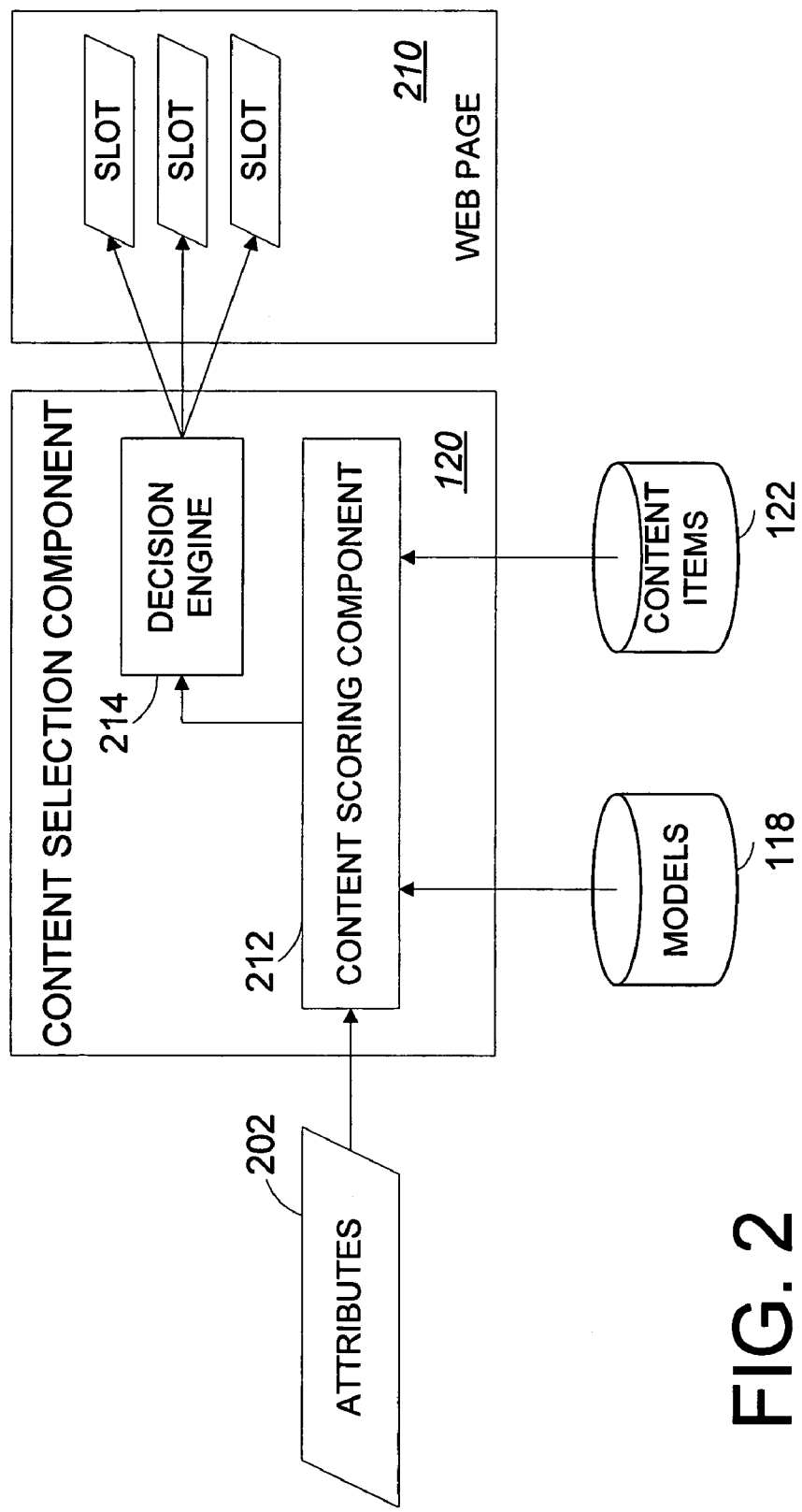
FIG. 2 illustrates a data flow diagram of a dynamic web page generation system according to an embodiment of the invention.

FIG. 2 illustrates a data flow diagram of a dynamic web page generation system according to an embodiment of the invention. In the data flow diagram, data generally flows from left to right. The initial conditions are as follows: the user has been identified; the user has requested a new web page from a referring web page; attributes 202 are known, models are available from the models database 118, and content items for a web page are stored in the content items database 122. At least partially in response to a request for a new web page 210, the content selection component 120 selects a content item from the content items database 122 that is incorporated into the web page 210.

Attributes

A broad variety of attributes can be collected and used to select a content item for a dynamically-generated web page. It will be understood that the relevancy of particular attributes can vary according to the repository of content items from which the content item is selected. In one example, an attribute is selected from at least one of a page attribute, a session attribute, a user attribute, a content item attribute, or a combination thereof.

A page attribute corresponds to an attribute of a served web page. Examples of page attributes include a path of or an identifier for the referring web page in the web site hosting the page.

A session attribute corresponds to a state of a user's browsing session. Examples of session attributes include: (a) the location of the current web page the user is requesting, (b) the locations of one or more previous web pages requested by the user, (c) time of day (e.g., morning, afternoon, evening), (d) time of year (e.g., summer, winter, Christmas), (e) what the user has in an electronic shopping cart, (f) whether the electronic shopping cart contains gifts, (g) attributes based on the value of the items in the electronic shopping cart, (h) how long the session has lasted, (i) items that a user has searched for in the past, and the like.

A user attribute corresponds to an attribute that is particular to the user. Examples of user attributes include the following: (a) a gender of the user, (b) an age of the user, (c) the past purchase history of the user, (d) how long the user has used the online merchant, (e) whether the user has made a purchase within the past year, (f) some indicia of whether the user is a frequent purchaser, (g) a geographical location of the user, (h) past items viewed on the site, such as previous product pages read by the user, (i) whether the user has purchased certain types of products (such as types of electronics, types of movies, types of music, age ranges for toys, etc.), (j) ratings of articles or products provided by the user, and the like.

A content item attribute corresponds to properties of a content item that is rendered by the web server 102. A broad variety of properties can be used to describe a content item. For example, the content item attributes can correspond to one or more of presentation attributes, computation attributes, semantic attributes, and the like. These content items can be used in an expected value computation, by, for example, increasing the value (benefit) or decreasing the value (cost) for providing the content item to the user.

For example, presentation attributes can describe a visual presentation of the content item, such as a size of the content item on the web page (pixel height and width), a data size, such as the number of bytes used to represent the content item, and a media type, such as text, graphical image, flash, pop-up window, and the like. For example, a content item that takes up a relatively large amount of space in a generated web page can be associated with a relatively high cost relative to a content item that takes up relatively little space.

In another example, computation attributes can relate to computations performed by the web server 102 in rendering the content item. For example, the computation attributes can include attributes such as a rendering time, e.g., an estimated time for providing the content item, and an indication of whether the content item itself is static or is further dynamically generated. An example of a static content item is a static advertisement, such as an advertisement for a newspaper subscription, credit card application, and the like. An example of a content item that can be either static or dynamically-generated is a list of recommendations. In such a list, the list can correspond to a static list or a list where the items are dynamically selected based on the attributes. The content selection component 120 can use the attributes and the models not only to decide select a content item for a web page, such as a dynamically-generated list of recommendations as the content item, but can also be used to dynamically-generate the content for the content item itself.

Where the content item is static, the rendering time can be relatively short, and the associated cost for providing the content item can be relatively low. However, where the content item corresponds to a list that is further dynamically generated, and a relatively large number of system computations (such as server requests) are consulted to generate the list, the rendering time can be relatively long, and the associated cost of providing the content item can be considered relatively high as a page should be presented to the user relatively quickly or there is a risk that the user loses patience interacting with the web site.

In another example, semantic attributes correspond to properties of a message carried by the content item. For example, there can be some direct costs or direct revenue associated with a particular content item, which can be captured in a discount attribute or in a promotion attribute. For example, a content item can correspond to a discount or coupon for a purchase. The cost of the discount can be factored into the value of providing the content item on the web page. In another example, a promotion attribute can be used to include a payment associated with presenting the content item.

Other attributes will be readily determined by one of ordinary skill in the art. Moreover, it will be understood that the types of attributes that typically collected and used can vary based on the offerings, e.g., goods or services, of the web site. For example, a web site that sells clothing can collect and use attributes related to a user's clothes size. By contrast, a person's clothes size is typically not relevant as an attribute to a web site that provides political news articles. Of course, it will be understood that the same web site or portal can sell a broad variety of offerings, such as with a department store, and that some attributes may be relevant for some purchases and other attributes relevant for other purchases. Accordingly, one embodiment of the dynamic web page generation system can automatically select from among the collected or available attributes the particular attributes that are relatively relevant to use for a given content item by using various statistical correlation techniques. In one embodiment, the relevant group of attributes are selected according to the eligible content for the web page. As will be described later in connection with FIG. 6, the eligible content can correspond to a subset of the content or to all of the content. In another example, a record in a database for the eligible content can indicate which attributes to use.

In addition, it should be noted that the labeling of an attribute as a page attribute, a session attribute, a user attribute, or a content item attribute can be somewhat arbitrary as selected attributes can fall into more than one category. For example, an attribute relating to "what the user has in an electronic shopping cart" can be classified as a session attribute or a user attribute. When a user has not been specified, other remaining attributes, such as session attributes, can be used to select appropriate content items.

It will be understood that the values for selected content item attributes can vary. For example, the estimated rendering time can be expected to vary depending on how many databases are queried to generate the list, how busy the servers and databases are, and the like. In one embodiment, rather than use a distribution for the varying attribute, such as an estimated rendering time, a relatively fixed estimate, such as a minimum, a maximum, an average, or a medium value for the attribute is used as a substitute.

Models

Models are used to generate probabilities for content items. In one embodiment, the models correspond to a probability functions. The probability models do not have to be normalized so that the sum of the probabilities is equal to 1. It should also be noted that for a probability model to be usable, the probability model should be based on a sufficient amount of data for reasonably reliable results. Until a sufficient amount of data is collected, default data can be used instead. In one embodiment, the probability model itself prioritizes between default data and actual data so that as data is accumulated, the probability model automatically switches to the use of actual data.

In one embodiment, the models are automatically generated by a data mining system via extraction of data from one or more data stores, such as the event database 112 correlated with attributes from the attribute database 114 as discussed earlier in connection with FIG. 1. In another embodiment, at least some of the models are automatically generated, and other models are provided by some other method, such as, for example, manual entry, copying from default data, copying from data from a similar content item, optimization or fine-tuning of automatically-extracted data, and the like.

It will be understood that the range of a reference of a model will depend on the nature of the attribute that is modeled by the model. For example, the range of a model based on gender is typically {male, female}. However, the range of a reference of a model can also be relatively large and nearly continuous. For example, attributes of "how much has the user purchased," a user's age, an elapsed web browser session time are examples of attributes with ranges of values having nearly continuous distributions.

In one embodiment, the content selection component 120 preselects eligible content items from which the content item is to be selected. For example, the eligible content items can vary according to whether the user is identified. In one example, for an identified user, the eligible content items can correspond to a relatively large subset or to the entire set of content items, and for an unidentified user, the eligible content can correspond to a relatively small subset of popular items. In another example, the eligible content can vary with a campaign limit and/or a campaign time. For example, a predetermined campaign limit, such as 5 impressions within a certain timeframe corresponding to a content item for a particular good can be associated with the good, and after 5 impressions within the time period, the content item can be removed from the set of eligible content items. In another example, a content item can be in the eligible content category for a predetermined time period, such as a time period for a rebate promotion, a sale promotion, a holiday promotion, and the like, and after the expiration of the predetermined time period, the content can be removed from the eligible content category. In addition, it should be noted that the techniques disclosed herein can be used to select some or all of the selectable content items for the web page 210, and that some of the content items for the web page 210 can be reserved for other content items, such as advertisements for a third party.

A content scoring component 212 ranks or scores the content items from the content items database 122 using the models from the models database 118 and the attributes 202.

A decision engine 214 then selects from among the ranked or scored content items. In one embodiment, the decision engine 214 further uses randomization techniques to select a content item. It will be understood that desirably, the same content item is not shown twice on the web page 210. The web page is then encoded in a language readable by the web browser, such as HTML, and the web page is served to the user computer 106.

Dynamic Web-Page Generation

Figure 3:
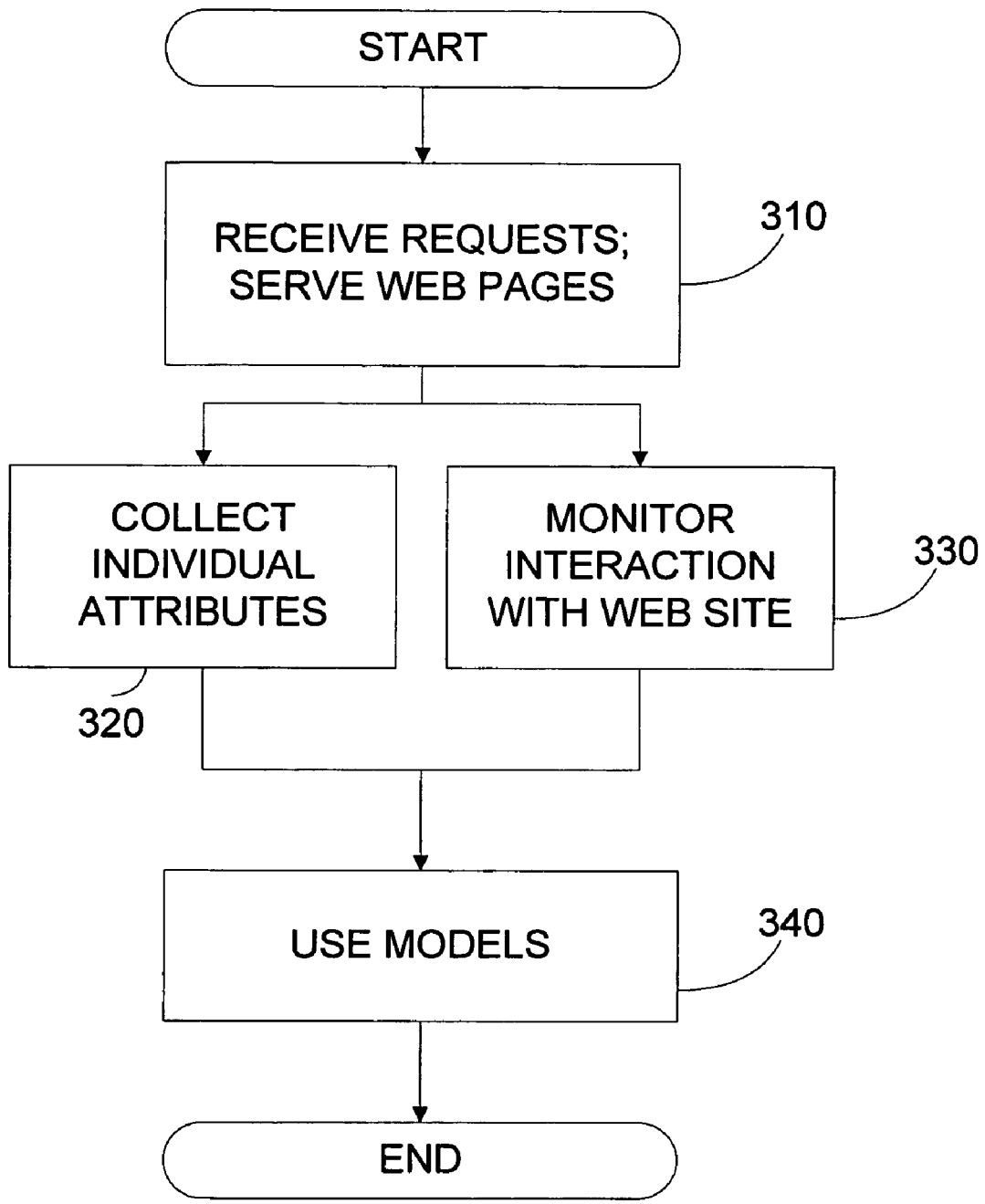
FIG. 3 is a flowchart that generally illustrates functions of the dynamic web page generation system illustrated in FIGS. 1 and 2.

FIG. 3 is a flowchart that generally illustrates functions of a process performed by the dynamic web page generation system illustrated in FIGS. 1 and 2. It will be understood by the skilled practitioner that some or all of the illustrated functions can be performed by a single system or by multiple disparate systems, in real time or offline, and sequentially or in parallel. In particular, it should be noted that many of the functions illustrated in FIG. 3 can be operated in parallel by different systems, such that during operation of the dynamic web page generation system 100, less than all of the depicted states can be in operation as will be described in further detail.

The process receives 310 requests for web pages from a plurality of user computers and serves appropriate web pages in response. At least a portion of the web pages served correspond to dynamically-generated web pages with intelligently-selected content items as described herein.

The process collects 320 attributes for individual users. For example, users can fill forms in to provide personal information, such as gender, age, addresses, and the like. It will be understood that the attributes can be collected over a period of time and can also be inferred from purchases and the like. In addition, it should be noted that at least a portion of the attributes can be known from prior sessions and do not necessarily need to be collected on an ongoing basis.

The process monitors 330 a user's interaction with the web site. A user's interaction is monitored and stored to collect data for extraction of parameters for the models.

The process uses 340 the attributes and the models to select from among the various content items which are under consideration for filling one or more slots of a web page. One embodiment including computation of probabilities to compute the expected values, e.g., expected payoffs or expected gains, will be described in greater detail later in connection with FIG. 6. In one example, the models are generated offline (not in real time), and are used in real time.

Process of Extracting Model Parameters

Figure 4:
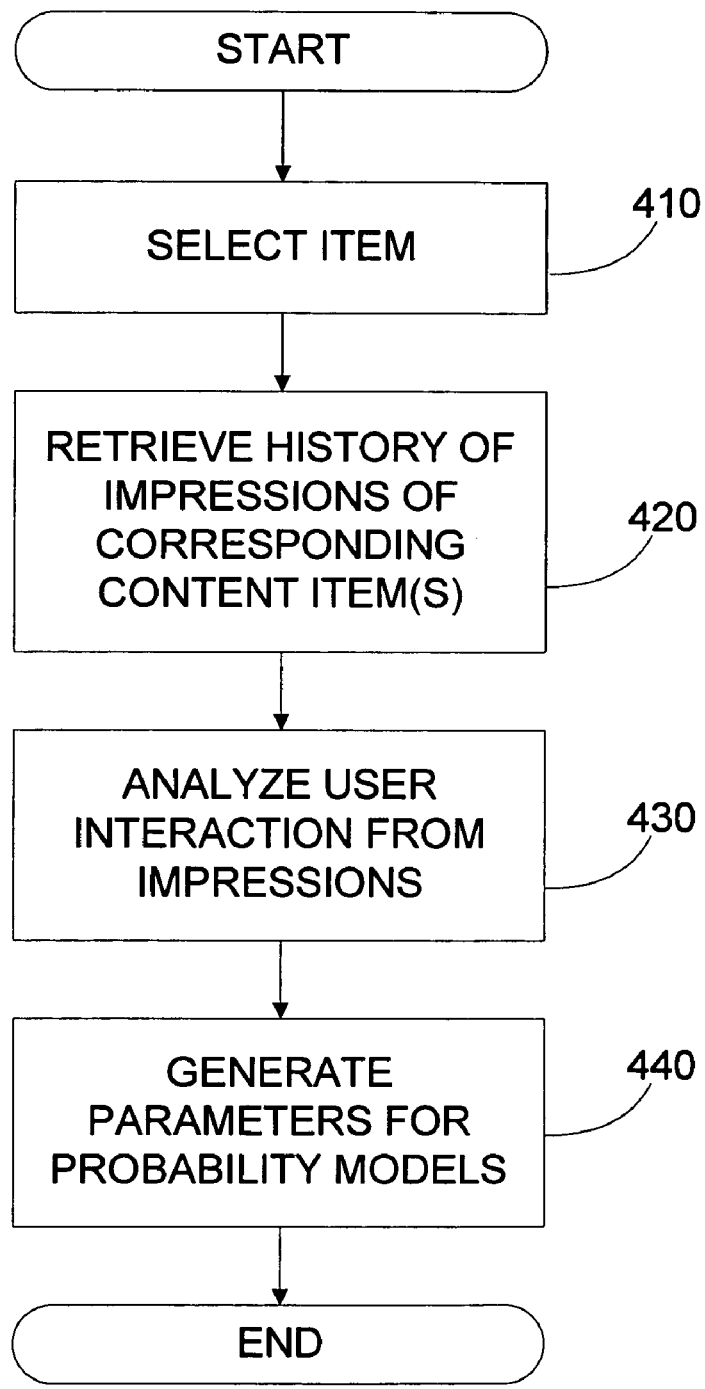
FIG. 4 is a flowchart that generally illustrates a process for extracting model parameters for a probability model.

FIG. 4 is a flowchart that generally illustrates a process for extracting model parameters for a probability model. The process begins by selecting 410 an item for model parameter extraction. For example, the item can correspond to a good or service offered in an online catalog.

Probability models are functions that can receive attribute values for a user as inputs and can generate a number or value that represents the probability of the user taking a corresponding response action, assuming that the user will be shown or exposed to the content item.

The process retrieves 420 a history of impressions of one or more content items corresponding to the item. For example, the history of impressions can be retrieved on a content item by content item basis.

The process analyzes 430 the collected user interaction data for the selected content item. For example, the user interaction data can include whether a user had interacted in some way, such as selected for further information, added to a shopping cart, purchased, and the like, a content item that was provided to the user's computer. For example, different types of interaction can be separately observed and related to particular attributes. For example, these attributes can be user attributes, session attributes, page attributes, content item attributes, combinations thereof, or the like.

The process generates 440 parameters for probability models. The model parameters for a model of a content item for a particular attribute. The characteristics of the attribute, such as a value for browser session time, can be used as a reference for the model. It will be understood that models can be generated for a broad variety of content items, attributes, and possible outcomes (user selections). For example, the outcomes can correspond to a user selection of a content item for more information, addition of a content item to a gift basket, addition of the content item to a wish list, a purchase of the content item, and the like. The references used can vary depending on the attribute for the model. In one embodiment, the process generates the models offline in a batch process.

Detailed Process of Extracting Model Parameters for a Content Item

Figure 5:
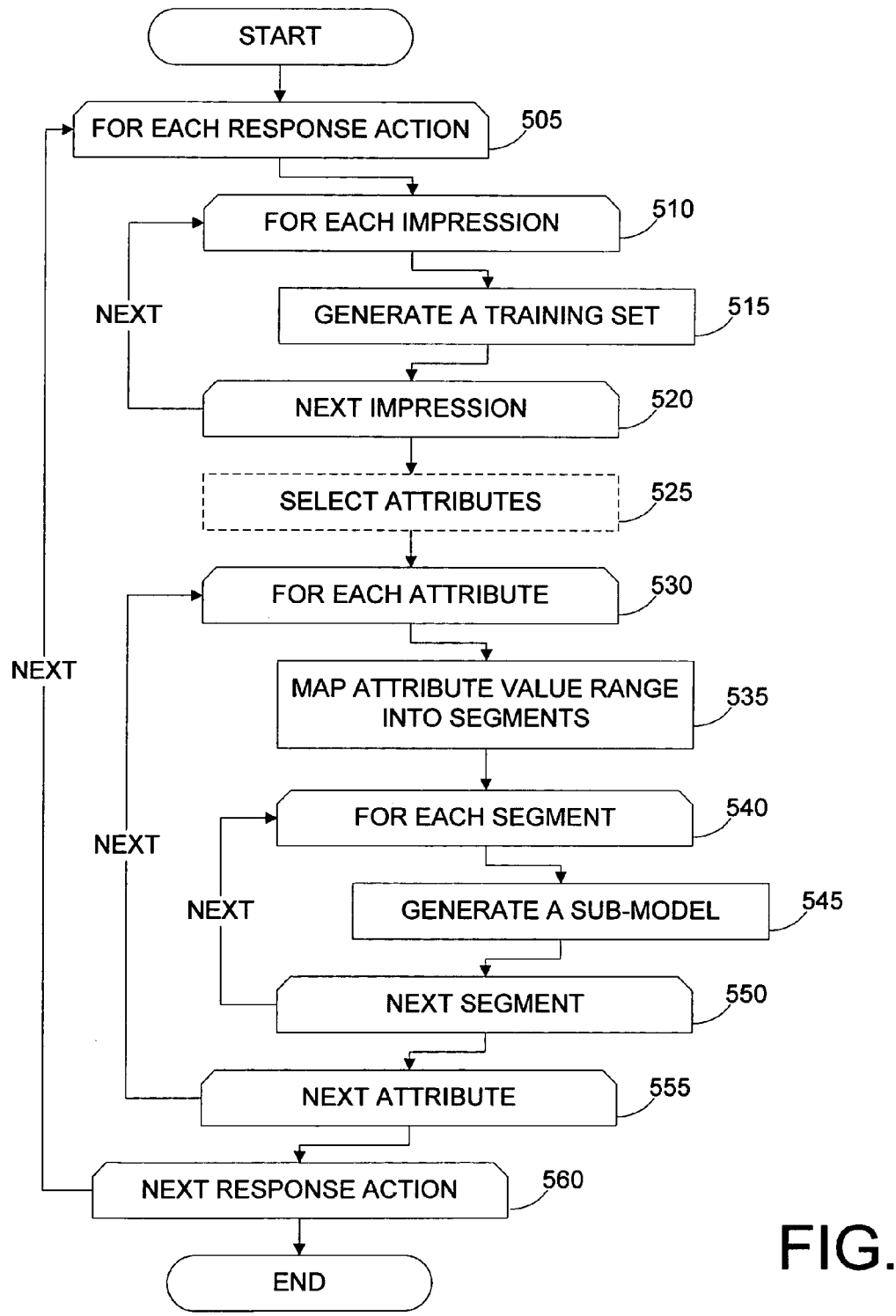
FIG. 5 is a flowchart that illustrates a process for generating a probability model for a content item.

FIG. 5 is a flowchart that illustrates further details of a process for generating a probability model for a selected content item. A probability model (or sub-model) can be generated for a content item and set of selected attributes, including sub-ranges or segments within attributes. The selected attributes can include, for example, content attributes, session attributes, and the like as will be described later. The probability model generates a probability measure that a user associated with particular values for attributes will respond to the displaying of a content item, such as in a slot of the web page 210, with a specific response action. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like.

The illustrated process is typically performed in a batch process offline. At the beginning of the process, data is available in the event database 112 and in the attribute database 114, and a particular content item for which a probability model is to be generated has been selected. The process will be described in the context of FOR loops, but it will be understood that other types of control can be used. The process begins at a FOR loop 505 to 560 for different response actions. Within this FOR loop 505 to 560 is another FOR loop 510 to 520 in which a training set is generated from relevant impressions as will be described later in greater detail. The training set can be for all attributes or selected attributes which are known to be useful. The attributes can be selected as will be described later in connection with a state 525. In another FOR loop 530 to 555, the attributes are analyzed and attribute values are mapped into ranges. A probability sub-model is generated for each of the collection of ranges for disparate attributes, which are termed "segments," in another FOR loop 540 to 550.

Examples of response actions can include, but are not limited to events such as clicking on the displayed content item, adding some item to a shopping cart, and the like. Actions can be more specific, such as the purchase of a particular product or viewing of a particular page. In one embodiment the model predicts the probability that a session click on a content item will occur.

For example, each content item has a plurality of probability models varying by response action and segments within ranges of attributes. In one embodiment, a probability model is instantiated from an applicable model family, and parameters for the model. For example, the parameters for a probability model can be determined by: Training Set Generation; Attribute Selection; and Model Parameter Learning. The process advances from the beginning of the FOR loop 505 to another FOR loop 510 to 520 for generating a training set for each relevant impression.

Training Set Generation

A training set is constructed to arrange data for analysis. The training set construction for a probability model of a content item combines data from the event database 112 and the attribute database 114 as follows. A set of impression events relevant for or associated with the particular content item is extracted from the event database 112. For example, there can be a lot of impression events that are not relevant to the content item. However, an impression event does not need a one-to-one correspondence with a content item to have relevance. For example, in one embodiment which will be discussed in greater detail later, impression events and response actions of similar products or classes of products can be pooled.

The set of relevant impression events can include all impressions for the model's content item. The set of relevant impression events can also correspond to a smaller subset of impression events to improve the efficiency for calculation or responsiveness to more recent data. Examples of such restriction include, but are not limited to, looking only at the most recent events with in a time window, such as the last two weeks, or if the number of impression events is relatively large, randomly sampling the set of impression events. In addition, these smaller subset methods may combined, such as randomly sampling impression events for the last two weeks.

For each relevant impression, a FOR loop 510 to 520 is used to generated a training set. After extracting the relevant impression events, a further set of pertinent response action events is determined from the event database 112. In one embodiment, a response action event pertains to an impression event when it satisfies two conditions: (1) it matches the correct response action type for which probability is being modeled and pertains to the content item being modeled; and (2) it is associated with an impression event for the content item determined in the previous step. The first condition is determined, for example, by matching the type of the event's profile with the action type. The second condition is computed by matching events that satisfy the first condition with temporally related impression events (up to some maximum window size) to determine if the event is associated with one of those impression events. For example, a response action for an event such as a purchase of a product can be associated with an impression of the content item for the product when the impression is displayed to the user and also, can be associated if the user purchases the product later that day. The details of that step are described next.

User response rates to impressions of content items can be relatively low. An impression event can be associated with zero or more action events, where zero indicates that there was no applicable user response to the impression event. For example, to determine whether an association exists between an impression event and an response action event, a set of candidate impressions can be defined as the set of all impression events for the content item temporally preceding the response event in some window of time, such as, for example, in the preceding 2 hours. In one embodiment, hypertext links (hyperlinks) generated dynamically for a content item contain sufficient information to uniquely associate a response action indicated by a user's clicking on or selection of those hyperlinks. Such information can then identify an association between the clicking on that link and the originating impression. For example, a unique identifier for the content item or items can be incorporated in the hyperlink's URL. Such hyperlinks may include a digital signature or be encrypted to prevent an antagonist from creating events or for the purposes of obfuscating the information that is being tracked by the operator of the web site. In addition, a hypertext URL can include enough information to identify a particular impression event for the URL. In another embodiment, multiple properties, such as session identifier encoded in a combination of browser cookies and URL, combined with a timestamp and content identifier can serve as such a unique identifier. Other business rules, to be discussed later, can also be used to determine indirect associations between impression events and response actions. Having determined a set of impression events and for each such event, a set of zero or more action events, a training set can be generated as follows.

A training set for a content item includes a collection of training examples for the content item for which a probability model is being generated. In one example, each training example includes one or more attribute values and label pair. An example of an attribute is gender. An example of an attribute value is "male." At this point in the process, there will typically be relatively many values for attributes that have been collected, and a determination of which attributes are useful to estimate a user's response to the content item will be described later in connection with Attribute Selection. A training example is labeled as a negative training example when an impression event is associated with zero response events, i.e., an impression event that is not associated with a response action. Each impression event that is associated with at least one response action is labeled as a positive training example. In one example, if multiple response actions exist for an impression event, each response action generates an individual training example. It will be understood that in other variations, a training example can accommodate more than one response action.

The attribute values associated with an impression event can be defined as follows. The attribute values are typically the value of those attributes at the time of the impression event. If such attribute values can change over time, then the attribute values used in the training example can be those computed at the time that the corresponding web page was generated. For example, the value of a referring page attribute can be the referring page at the time the web page was dynamically generated, as opposed to the referring page of the response action event.

Optional Attribute Selection 525

The process advances to select attributes 525. Attribute selection does not have to be performed each time the process is executed. Rather, the results of previous attribute selection can be reused and/or updated as necessary. Attribute selection is the process of determining, among many attributes, which attributes are useful for estimating the probability of a particular response action being modeled for a content item, such as a response action corresponding to a user's selection of a product for purchase. In one embodiment, attribute selection is optional. Attribute selection can significantly increase the accuracy of model parameters learned from the training data. In one embodiment, attribute selection is performed separately and prior to model parameter generation. However, it will be understood that in some cases, attribute selection can be performed later, can be performed at regular intervals, can be performed concurrently, such as every time the model parameter determination process is used, and so forth.

In one embodiment, a relatively large set of candidate attributes is correlated with the training data generated from historical event and impression data to select the most highly correlated attributes for use to construct a probability model for a content item. This attribute selection process can be fully automated, can be manually performed, or can be a combination of both. In one embodiment, the method of determining correlation is to determine the "mutual information" or transformation between a response action and an attribute value as the random variables. The attribute values with the highest ranking mutual information scores with the response variable are selected as the model.

In one embodiment, the mutual information I(X;Y) is computed according to Equation 1.

$$I(X;Y) = \sum_{y \in Y} \sum_{x \in X} p(x,y) \log \frac{p(x,y)}{p(x)p(y)} \quad \text{(Eq. 1)}$$

In Equation 1, X and Y are the random variables, p(x,y) is the joint probability distribution function of X and Y, and p(x) and p(y) are the marginal probability distribution functions of X and Y. respectively. A variety of other techniques can also be used to determine correlation, and other techniques that can be used will readily be determined by one of ordinary skill in the art. In Equation 1, x corresponds to an attribute and y corresponds to a label.

To use the technique described in connection with Equation 1, continuous variables are discretized or "binned." A variety of techniques can also be used for discretizing or binning variables. For example, the techniques disclosed by Usama M. Fayyad and Keki B. Irani in *Multi-interval discretization of continuous-valued attributes for classification learning*, in Proceedings of the 13th International Joint Conference on Artificial Intelligence IJCAI-93, volume 2, pages 1022-1027. Morgan Kaufmann Publishers, August/September 1993, pp. 1022-1027, can be referenced. Another reference for discretization or binning is by R. Kohavi and M. Sahami in *Error-based and entropy-based discretization of continuous features*, in Proceedings of the Second International Conference on Knowledge Discovery and Data Mining, pp. 114-119, Portland, Oreg., August 1996, AAAI Press. Other applicable techniques will be readily determined by one of ordinary skill in the art.

For example, a "logistic regression" model can be used to determine which attributes are relatively strongly correlated with a particular response action. For reference, see *Categorical Data Analysis*, by Alan Agresti, Wiley-Interscience, (2nd Ed. 2002). One benefit of using a logistic regression model is that a discretization of continuous variables can be avoided. A logistic regression model can be trained on a relatively large set of attributes. In addition, interaction terms as described by Agresti, supra, of first or second order can be included if it is believed that, for example by having high correlation measurements like mutual information between attribute values, that correlated attributes exist.

Many methods and statistical tools, e.g., SAS, can be used to generate logistic regression models from the training set. An attribute can be selected from such models by selecting attributes that have high statistical significance, e.g., relatively high chi-squared values, as well as a significant coefficient. Another technique that can be used is to use regularized logistic regression methods, as discussed in *Feature selection, L1 vs. L2 regularization, and rotational invariance*, by Andrew Y. Ng in *Proceedings of the Twenty-first International Conference on Machine Learning*, 2004, to determine a sparse set of regression coefficients and select those attributes with non-zero coefficients.

Removal of Redundant Attributes

Optionally, redundant attributes, i.e., those attributes that are highly correlated with each other and the response variable, are removed from the set of attributes. For example, a simple greedy strategy can be used as described in the following. The attribute that is the most correlated variable with the response action is found. That attribute or attribute is termed A1. The mutual information data of A1 with the other attributes are then determined. Attributes having a mutual information score exceeding a given threshold can be considered redundant and can be removed from the probability model.

Pooling of Response Actions

In certain situations, the response action rates encountered can be relatively low. For example, the response action rate of users clicking on a content item on a website homepage can be quite low, such as, for example, as low as one percent. In these situations, positively-labeled training examples for the content item under analysis may be hard to obtain. In situations such as these, it can be desirable to pool the response actions of one content item with the response actions of other content items such that the amount of data to analyze is usefully large.

One way to overcome this problem is to combine the response actions for related content items, such as similar products, into a single training pool for attribute selection. The attribute selection is applied to the pool, and the useful attributes or attributes are found. In one embodiment, the training set is generated from a set of campaigns that are representative of the set of content items. For example, response action data from an entire website can be sampled and used to form a training set. In another case, content items whose responses are highly correlated response actions (as determined by, for example, mutual information scores) are grouped together as a single training set.

Model Parameter Learning

In the illustrated embodiment, a segmented model is used for the probability model of a particular action response. For example, a FOR loop 530 to 555 can be used to map attributes ranges into segments and find corresponding probabilities. The probability for each segment is determined for a sub-model of the probability model. For each of the identified attributes, the process maps 535 the attribute value range into segments, and generates 540 to 550 a probability sub-model for each of the segments.

Segmented Models 535

In a segmented model, the set of collected attribute values are mapped into a set of k different segments, and the model predicts the probability of response separately for each of the k segments. In one embodiment, a segment includes a combination of attribute ranges for different attributes. For example, attributes can be a person's age, a person's gender, and a person's recent purchase amount, and a segment can include a range for age, a female gender, and purchases over $500 in the last six months. The number of segments k can vary depending on the nature of the collected attributes. In one embodiment, probability models are generated for about 10 to about 30 segments. A segmented model can be generated as follows: (a) the number of segments k corresponding to the given set of attribute value using a segment assignment rule is determined; (b) a probability model or sub-model is generated for each segment; (c) the probability for the each segment is determined.

The procedures described earlier for training of probability models for attributes can also be used for the probability sub-models of segments of attributes. For example, training sets with training examples can be used to organize data.

Selecting the Number of Segments (k)

It is desirable to generate a set of k segments that is useful for probability estimation. The properties of such segments should include: (1) sufficient data to estimate model probabilities reliability; in other words, segments should not be so fine-grained that insufficient training data is available for a segment; and (2) response within a single segment captures a coherent part of behavior, e.g., "female customer who have more than one year of at least 5 purchases and one kitchen product purchase."

The following describes one technique that can be used to generate a set of such segments for a given set of attribute values. To generate the number of segments k, the following recursive procedure can be used to grow a "decision tree" from a training set. After the procedure, the segments are the leaves of the resulting decision tree. In one embodiment, the procedure includes (1) to (4) below:

1) If the current segment size is less than a configured threshold, stop
2) Pick the attribute with the highest information gain for the current training set. Call that attribute A.
3) Split the data set into different values based on the values of attribute A. Create new training sets and invoke this training procedure recursively on those data sets.
4) Recursively generate decision trees for the split data sets (starting from step 1).

Many techniques are applicable to the estimation of probability parameters. For example, Naïve Bayesian models, Regularized Logistic Regression models, Simple Probabilities models, and the like can be used.

Naïve Bayesian Models

A Naïve Bayesian model can be used to estimate probability parameters. A Naïve Bayes model assumes the probability of P(Y|X) is computed as $$P(Y \mid X_1 \ldots, X_n) \propto P(Y) \prod_{i=1}^{n} P(X_i \mid Y),$$

where P(Y) is the prior probability of a response and P(X_i|Y) indicates the probability of an attribute $X_i$ having a specific value given the response value variable. The probability can be normalized if needed to make it a true probability. The parameters of a Naïve Bayesian model are the values of P(Y) and P(X_i|Y). Standard techniques can be used to estimate these as the observed counts on the training set:

$$\hat{\theta}_{ijk} = \hat{P}(X_i = x_{ij} \mid Y = y_k) = \frac{\#D\{X_i = x_{ij} \wedge Y = y_k\} + l}{\#D\{Y = y_k\} + lJ} \quad \text{(Eq. 2)}$$

In Equation 2, #D denotes observed counts of training examples in the training set. If the estimate are "smoothed", then the parameters i and j are used to provide a number of "pseudo-example" that incorporate prior knowledge.

Regularized Logistic Regression

Logistic Regression can assume a parametric form for the distribution P(Y|X). Parameters for Logistic Regression can be learned using, for example, standard methods, such as those described by Agresti, supra.

Simple Probabilities Models

Many techniques can be used with the segmented model to generate a simple probability distribution, such as a Normal, Gamma, or Log-Normal distribution for a parameter using the maximum likelihood estimate of distribution parameters (mean and variance for Normal and Log-Normal, two parameters for the Gamma distribution).

Content Item Value Assignment

It can be beneficial to establish a "value" or benefit associated with the content items. For example, if the system is used to optimize downstream revenue from content items on a website, the method can determine the dollar value for a user's purchases. Since the link between "value events," that is, any event that is assigned a specific value, such as a purchase and the like, and the impression of different content items can be indirect, the association of value or benefit can be a challenge. Typically, the connection is probabilistic and not deterministic, that is, viewing a content item is typically not likely to lead to a specific response by a user.

In one embodiment of this invention, a user's interactions with a website are divided into visits (also known as sessions). A "session" can vary in length. A session can be a single 24 hour period, can be a set of consecutive website page hits such that the interval between two page hits is less than a predefined value indicative of user inactivity, such as two hours, and the like. The set of value events within a single user's visit can be collected and summed as the visit's value. For example, the sum of the dollar value of all purchases can made within a visit can be called the visit's downstream value. In one embodiment, this value can then be divided among all content items that were impressed during the user's session.

In one embodiment, the set of content items eligible to be assigned value are divided into items to which the user responded (determined as described above), termed "response items," and those which the user was shown but from which no response was elicited, termed "non-response items." The set of non-response items is typically expected to be much larger than the set of response items.

In one embodiment, the value of a visit is divided equally among all response items. Non-response items receive a value of zero. The set of all such value assignment is then used to generate a training set of response values from which distribution statistics, such as observed mean, standard error and the like, can be derived. These value estimates can then be applied in the content selection as described earlier in connection with FIG. 2.

Other Rules

In one embodiment, business rules are used to determine other conditions for associating a response action to an impression event. For example, such logic can associate a user's purchases with all content item impression events that promote a specific product or class of products, attach a value to a new customer signing up for a credit card promotion and the like.

Selecting a Content Item for a Web Page

Figure 6:
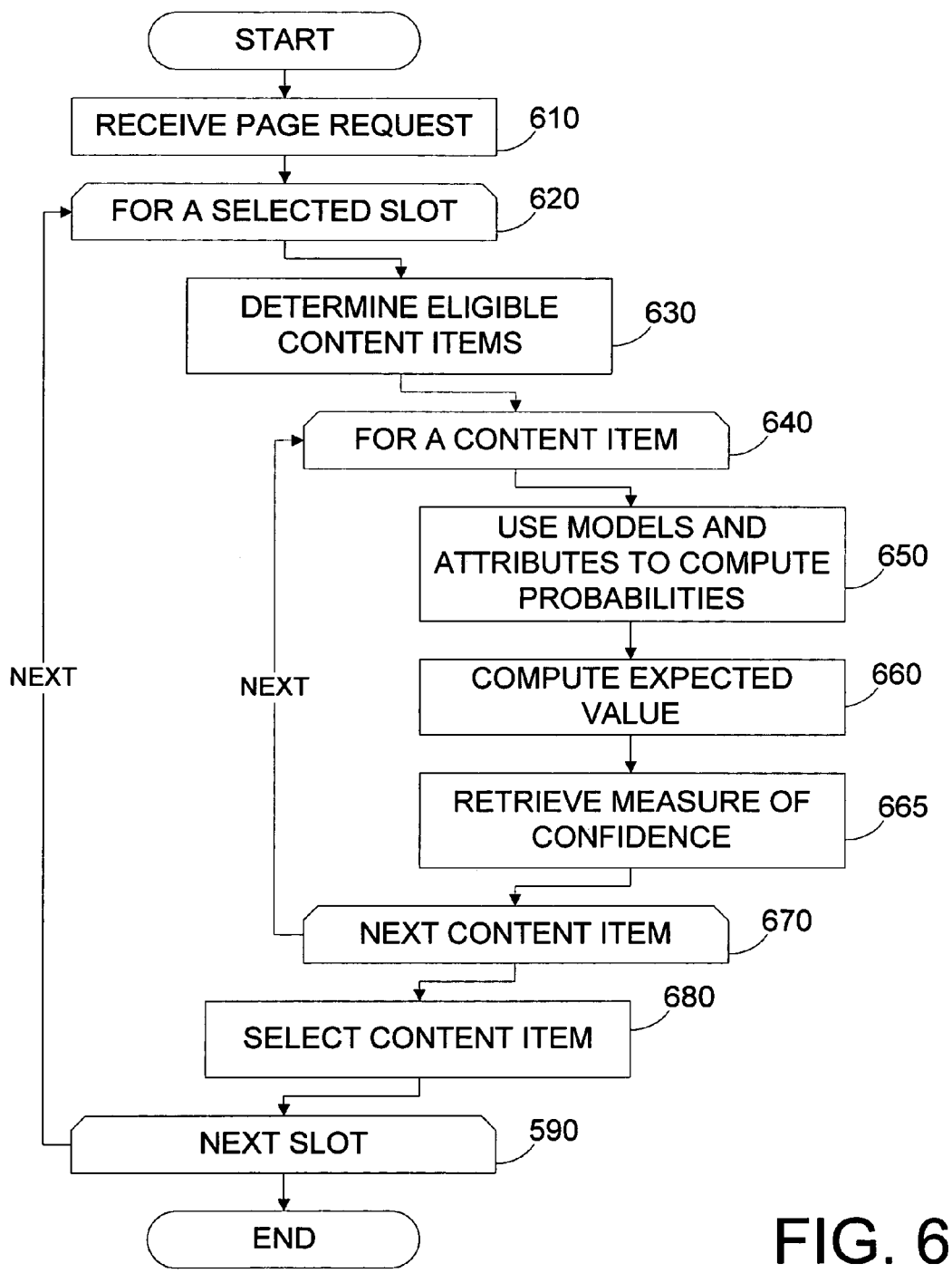
FIG. 6 is a flowchart that generally illustrates a process for selecting a content item for a web page.

FIG. 6 is a flowchart that generally illustrates a process for selecting a content item for a web page. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like.

At the start of the process depicted in FIG. 6, the following is known to or has been generated by the process generating the web page: the user has been identified, a previous web page has been served (the referring web page), and models for content items are available.

In a state 610, the process receives a request for a new web page from the user via interaction with the referring web page. The new web page has one or more "slots" within the web page for which a content item is dynamically selected by the process as a component of the web page.

The process advances to the beginning 620 of a "FOR" loop. The FOR loop processes content items for the one or more number of slots for which a content item is to be selected according to the process. For example, the number of applicable slots can be specified by a template for the web page.

The process advances to a state 630, where the process determines which content items correspond to eligible content items for the web page, i.e., the collection of content items from which the content item is selected. This can be based on whether a user is identified, based on time periods, based on campaign limits, combinations thereof, and the like. In one embodiment, the eligible content items correspond to all the content items.

The process advances to the beginning 640 of another FOR loop, which computes the probabilities for the eligible content items for the slot. In a state 650, the process uses the applicable attributes for the dynamically-generated web page as references to calculate probabilities from the corresponding models.

Where a model for a particular content item or for a particular attribute is not available, such as, for example, where no data or not enough data has been collected so that a resulting model is not considered trustworthy or valid, a default model can be used. It should be noted that the probabilities for more than one possible outcome can be computed. For example, the probability of adding a particular good to an electronic shopping cart can be computed as one outcome, the adding of the good to a gift basket can be computed as another outcome, and the selection of a good for further information, such as a web page for the good, can be computed as yet another outcome. In one embodiment, the multiple outcomes (user selections) are used with multiple weights when computing expected values.

The process advances to a state 660, where the process computes expected values for the content item. In one embodiment, the expected values are computed for selected content items, and for other content items, the expected values can be retrieved rather than calculated. In addition, when new content items are added and not enough data has been collected to extract reliable model parameters for these newly-added content items, the expected values can be based on default values, manually-generated estimates, computations based on probabilities of similar content items, and the like. A value or payoff associated with the content item can be combined with the probability computed or retrieved for the content item to generate an expected value. A variety of possible user selections can be considered, and different values or payoffs can be associated with variety of user selections.

Expected Value

A value W can advantageously be used to weight computed probabilities of various content items to compute an expected value (E) or value predicted ($V_p$) for that content item. The value can be associated with a content item in a record in a database. The value can represent some measure of value, benefit, or other payoff to an entity operating a web site that would result from a user activity related to a component on a web page. The user activity can include any activity performed by the user with respect to an impression or component on the web page, such as, for example, traversal of a hypertext link corresponding to the component, the addition into an electronic shopping cart of a good corresponding to the component, the detection of a "mouse-over" occurrence by an applet associated with the component, and the like. For example, the value can be related to a profit associated with the sale of a product or combination of products, e.g., such as including accessories, corresponding to the content item. The value W can correspond to actually computed values, to estimated values, to combinations of both, and the like. In addition, for the purposes of selecting content items for slots on a dynamically-generated web page, it will be understood that the values used to compute the expected values can correspond to relative values to support the comparison of various content items rather than to absolute values. Of course, absolute values can also be used.

In one example with an online merchant and absolute values, the value for a component can be representative of a margin, profit, or contribution associated with a user's purchase of a good that is associated with the component. Other indirect payoffs, such as anticipated payoffs for extra cost options, such as extended warranties or for maintenance supplies, such as toner cartridges for laser printers, can also be included.

For example, the component can correspond to a hyperlink to a particular good, and the value or payoff can be associated with a profit margin associated with the sale of that good. The good can correspond to a product, service, or anything for sale. In another example with an information-oriented web site, the value or payoff can correspond to the value associated with interaction with the web site, such as traversing to another web page, which can correspond to informational web pages, sponsored web pages, advertisements, and the like, participation with surveys, and so forth.

It is possible to have more than one value or payoff associated with a component as there can be more than one possible user response. For example, a web site can combine characteristics of both a web site for commerce and a web site for information. For example, a content item for a product, such as a item of music, can correspond to a hyperlink to a web page with additional information regarding that product. There can be multiple activities or possible user selections associated with selection of the content item. These activities or user selections can be independent or can overlap. Illustrative examples of possible user selections for selection of a content item include (a) traversal to or impression of the linked web page $A_1$; (b) addition of the product related to the component to an electronic shopping cart $A_2$; and (c) addition of the product related to the component to an electronic wish list $A_3$. Values $W_1$, $W_2$, and $W_3$ can be used to weight probabilities P associated with the possible user selections $A_1$, $A_2$, and $A_3$, respectively, to compute an overall expected value E for the component as shown in Equation 3.

$$E = W_a P(A_a) + W_b P(A_b) + W_c P(A_c) \quad (Eq. 3)$$

The process retrieves 665 a measure of confidence for the expected value of a content item. In one embodiment, the measure of confidence for the expected value is at least partially based on a computed measure of confidence for an underlying probability computed to calculate the expected value. In one embodiment, the measure of confidence is computed during the generation of the underlying probability model, and the result of the computation is reused at the state 665.

In one embodiment, the computed measure of confidence corresponds to a confidence interval for the expected value. For example, where an expected value is 10 dollars, the confidence interval can correspond to an interval from 8 dollars to 12 dollars. In one embodiment, the confidence interval is computed based on an estimated sample variance and on a selected confidence factor. In one embodiment, the process uses the variance in the samples of the probability model, such as a probability function used to compute the expected value. The confidence factor corresponds to a degree to which the actual value for the expected value, such as the actual profits, can be expected to fall within the confidence interval of the expected value. The selected confidence factor can be selected from a very broad range. In one embodiment, the confidence factor corresponds to 95%. Other applicable values for the confidence factor will be readily determined by one of ordinary skill in the art.

The process proceeds to the end 670 of the FOR loop, where the process advances to a state 680 when done with the processing of eligible content items or returns to the beginning of the FOR loop 640 to continue with further eligible content items.

In the state 680, the process uses the probabilities, expected values, and/or the measure of confidence, such as a confidence interval, to select a content item for the dynamically-generated web page. It should be noted that the expected values and the measures of confidence for content items can include dynamically-computed values and can also include predetermined values that are retrieved. In one embodiment, the process selects the content item based on highest probability and/or highest expected value. In another embodiment, the process uses the probability and/or expected value, but does not necessarily select the content item with the highest probability and/or expected value. For example, the content item can be selected in a pseudo-random manner with probability of selection corresponding to the probability and/or expected value computed for the content item. In another embodiment, the probability and/or expected value is modified by another factor such as, for example, a recent price reduction, an indication of an overstocked item, an indication of a soon to be obsolete item, and the like. It will be understood by the skilled practitioner that where the computed probabilities and/or expected values are used for comparative purposes, that the probabilities do not have to directly correspond to a strict definition of probability, and that the expected values to not have to be computed in dollar or other currency amounts.

In one embodiment, where confidence intervals are computed, the content items with confidence intervals that overlap with the confidence interval of the highest-ranking content item are considered relatively good candidates for inclusion in the dynamically-generated web page. In one embodiment, the content items with overlapping confidence intervals are selected with relatively equal probability for inclusion in the dynamically-generated web page.

The process advances to the end 690 of the FOR loop, where the process ends when done with processing of the slots for the dynamically-generated web page. Where further slots remain to be processed, the process returns from the end 690 of the FOR loop to the start 620 of the FOR loop.

Various embodiments of the invention have been described above. Although described with reference to these specific embodiments, the descriptions are intended to be illustrative and are not intended to be limiting. Various modifications and applications may occur to those skilled in the art without departing from the true spirit and scope of the invention as defined in the appended claims. In the claims, the phrase "based on" shall include situations in which a factor is taken into account directly and/or indirectly, and possibly in conjunction with other factors in producing a result or effect. In method claims, reference characters, if any, are used for convenience of description only and do not indicate a particular order for performing a method.

What is claimed is:

1. A system for selecting one or more content items in a dynamically-generated display, the system comprising:
   a web server computer system comprising a memory operatively coupled to a processor, the web server computer system configured to receive a request for a display from a client computer, and to relate the client computer to a particular user; and
   a content selection computer system in communication with the web server computer system, wherein the content selection computer system is configured to retrieve values for a plurality of attributes of the particular user, and, for each content item of a plurality of content items, to:
      retrieve a probability model associated with the content item;
      compute probabilities with the retrieved attribute values for the particular user as inputs for the probability model;
      retrieve payoff values associated with the one or more user responses to the content item; and
      retrieve confidence intervals for the payoff values for each content item, wherein a confidence interval is a range of the payoff values bounded by a confidence factor;
   wherein the content selection computer system is configured to select a content item from the plurality of content items for the dynamically-generated display based at least on the probabilities, payoff values, and confidence intervals.

2. The system as defined in claim 1, wherein the content selection computer system is configured to select the content item based on the probabilities, payoff values, and confidence intervals for the content items.

3. The system as defined in claim 1, wherein the display comprises a web page.

4. The system as defined in claim 1, wherein the probability models have attribute ranges for a plurality of attributes that are segmented into a plurality of segments, wherein the particular user's attribute values maps to one segment of the plurality.

5. The system as defined in claim 1, wherein the content selection computer system is configured to select a first content item with equal probability as a second content item when their confidence intervals overlap.

6. A method of statistically selecting one or more content items for a dynamically-generated display, the method comprising:
   retrieving a plurality of probability models associated with candidate content items;
   using the probability models to compute probabilities of an occurrence of one or more interactive user responses to exposure to the candidate content items;
   retrieving one or more payoffs associated with the one or more interactive user responses to the candidate content items and one or more confidence intervals associated with the one or more payoffs, wherein a confidence interval is a range associated with the payoffs bounded by a confidence factor; and
   selecting one or more content items from the candidate content items for the dynamically-generated display, wherein the selection is made automatically by a computer system and is based at least on the computed probabilities, the retrieved payoffs, and the confidence intervals.

7. The method as defined in claim 6, further comprising using the probability models to dynamically generate confidence intervals of expected values for content items of a first list, and selecting a second list of a plurality of content items for display from the first list based on the confidence intervals.

8. The method as defined in claim 6, further comprising selecting based on the computed probabilities, the retrieved payoffs, and the confidence.

9. The method as defined in claim 6, wherein selecting further comprises:
   computing expected values for the one or more user responses for the content items using the probabilities and the payoffs associated with the one or more user responses; and
   selecting the one or more content items based on the computed expected values.

10. The method as defined in claim 9, further comprising computing the expected values with a randomization component such that the content items with an otherwise higher expected value are merely more likely to be selected than content items with an otherwise lower expected value.

11. The method as defined in claim 9, further comprising:
    computing confidence intervals when applicable or retrieving default confidence intervals for the content items; and
    selecting the one or more content items at least partially based on the computed expected values, the computed confidence intervals, the retrieved default expected values, and the retrieved default confidence intervals.

12. The method as defined in claim 9, wherein selecting further comprises selecting based on the highest expected value.

13. The method as defined in claim 6, further comprising:
    computing expected values for the one or more user responses to the content items using the probabilities and the values associated with the one or more user responses;
    retrieving default expected values for content items for which a usable probability model is not available; and
    selecting the one or more content items at least partially based on the computed expected values and the retrieved default expected values.

14. The method as defined in claim 13, further comprising:
    computing confidence intervals when applicable or retrieving default confidence intervals for the content items; and
    selecting the one or more content items at least partially based on the computed expected values, the computed confidence intervals, the retrieved default expected values, and the retrieved default values of confidence intervals.

15. The method as defined in claim 6, further comprising:
    retrieving predetermined values for at least a portion of the content items for at least one of the probability of a user response or a computation based on the probability; and
    selecting the one or more content items using calculated probabilities and predetermined probabilities.

16. The method as defined in claim 6, when a probability model is not available for a content item, using one of manual entry, copying from default data, or copying from data from a similar content item to substitute for the probability model, and selecting the one or more content items using probabilities calculated from probability models and substitutes.

17. The method as defined in claim 16, further comprising:
    computing confidence intervals when applicable or retrieving default confidence intervals for the content items; and
    selecting the one or more content items at least partially based on the computed expected values, the computed confidence intervals, the retrieved default expected values, and the retrieved default confidence intervals.

18. The method as defined in claim 6, further comprising retrieving attributes associated with a user of the display.

19. A method for generating a plurality of probability models for a content item that can be displayed in an interactive display, the method comprising:

(a) selecting the content item for which the plurality of probability models are to be generated;

(b) collecting records of impressions relevant to the content item;

(c) for each relevant impression, performing (d), (e), and (f) to collect information:

(d) determining zero or more actual user responses for the impression;

(e) retrieving attribute values corresponding to the impression;

(f) associating the retrieved attribute values with the zero or more user responses to the impression;

(g) retrieving collections of ranges for a plurality of attributes;

(h) determining individual segmented probability sub-models for each type of applicable user response and applicable collection of ranges for the plurality of attributes based on the associated retrieved attribute values and user responses; and (i) computing a confidence interval of an expected value for each probability sub-model, wherein a confidence interval is a range of expected value bounded by a confidence factor;

wherein the method is performed automatically by a computer-implemented system.

20. The method as defined in claim 19, wherein the content item corresponds to a good offered for sale through a web site for the web page.

21. The method as defined in claim 19, wherein the impression includes displaying and at least one of no interaction, interaction by clicking, interaction with a web page by selecting, interaction with a game, or interaction associated with viewing a video clip.

22. The method as defined in claim 19, where the actual user response corresponds to at least one of no response, purchasing a related item, adding to an electronic shopping cart, adding to a gift basket, or adding to a wish list.

23. The method as defined in claim 19, further comprising identifying those attributes which are correlated with user actions, collecting attribute values for user responses and determining individual probability sub-models for only those attributes.

24. The method as defined in claim 19, wherein the confidence interval is computed based on an estimated sample variance and on a selected confidence factor, wherein the confidence factor corresponds to a degree to which an actual value is expected to fall within the confidence interval.

* * * * *